United States Patent [19]

De Schepper et al.

[11] 4,061,564

[45] Dec. 6, 1977

[54] TREATMENT OF SOLUTIONS CONTAINING IMPURE METALS

[75] Inventors: Achille De Schepper, Lichtaart; Antoine Van Peteghem, Olen, both of Belgium

[73] Assignee: Metallurgie Hoboken-Overpelt, Brussels, Belgium

[21] Appl. No.: 669,586

[22] Filed: Mar. 23, 1976

[30] Foreign Application Priority Data

Apr. 18, 1975 Luxembourg .......................... 72319

[51] Int. Cl.² ............................................. B01D 11/04
[52] U.S. Cl. ....................................... 210/21; 423/24; 423/87; 75/117
[58] Field of Search ............... 423/87, 88, 24; 210/21; 75/117; 204/108

[56] References Cited

U.S. PATENT DOCUMENTS

| | | | |
|---|---|---|---|
| 2,805,936 | 9/1957 | Schaufelberger | 75/117 |
| 3,249,399 | 5/1966 | Hoffmann et al. | 423/88 |
| 3,573,182 | 3/1971 | Churchward et al. | 423/24 |
| 3,912,801 | 10/1975 | Stephens | 423/87 |
| 3,988,225 | 10/1976 | Schulze | 204/108 |
| 3,989,607 | 11/1976 | Bush et al. | 423/24 |

OTHER PUBLICATIONS

Chemical Abstracts 78: 19131a, (1973).

*Primary Examiner*—Thomas G. Wyse
*Attorney, Agent, or Firm*—Fred Philpitt

[57] ABSTRACT

A process for treating an aqueous acid solution containing at least one element selected from the group of elements consisting of As, Sb and Bi, said process comprising contacting the aqueous solution with an organic phase comprising an organophosphoric compound having the general formula $(RO)_3 P = O$ wherein R represents an unsubstituted or substituted alkyl, aryl or aralkyl group, while maintaining a temperature of between 10° and 60° C and an organic phase/aqueous phase ratio of between 0.1 and 5, whereby the elements of said group and acid are extracted from the aqueous phase to the organic phase, and separating the resultant pregnant organic phase from the aqueous phase.

14 Claims, No Drawings

TREATMENT OF SOLUTIONS CONTAINING IMPURE METALS

The present invention relates to a process for de-arsenizing, de-antimonizing and/or de-bismuthizing aqueous acid solutions, more especially solutions from the electrorefining or electrowinning of copper.

It is known that in copper electrorefining the soluble elements copper, nickel, etc., or partly soluble : arsenic, antimony and bismuth, accumulate in the electrolyte and that it has been proven necessary to purify the said electrolyte by a bleeding in which valuable elements such as copper and nickel have to be recovered. The treatment of the purifying bleeding differs from one refinery to another as well with respect to recovery of copper and nickel as with respect to the elimination of the undesirable elements : arsenic, antimony and bismuth.

In most cases, these impurities are eliminated by electrolysis by means of insoluble anodes after one or several preliminary decopperizing steps and, if necessary, after a concentration of the electrolyte by evaporation.

The drawbacks inherent to this process are the low current yield due to the acidity, generally high, of the solutions, the low energy yield inherent to electrolysis with insoluble anodes, the obtainment of a deposit of arsenic, antimony and bismuth containing copper which has to be further processed by pyrometallurgical or in any other way for re-extracting the copper, the important corrosion of the plant due to high acidity of the medium and the risk of formation of arsine ($AsH_3$) a very toxic gas.

Another purification process requires the reduction of pentavalent arsenic to trivalent arsenic, for instance by means of $So_2$, in order to precipitate $As_2O_3$. Another process consists in treating the solution with an excess of trivalent antimony in order to precipitate a mixed oxide of arsenic and antimony. These processes are far from quantitative and they yield residues which are particularly difficult to filtrate.

As to the de-arsenizing by precipitation with sulfides, this entails unavoidably an important co-precipitation of copper, which requires a new treatment.

On the other hand it is possible to eliminate most of the arsenic during the refining previous to the casting of the anodes, for instance by slagging arsenic with sodium carbonate, but this involves premature wear of the refractory material of the furnace, and the necessity of retreating the sodic slags which unavoidably contain large amounts of copper, so that the costs of the arsenic elimination becomes rapidly excessive.

The object of the present invention is to permit a satisfactory de-arsenizing and/or de-antimonizing and/or de-bismuthizing, which do not present any of the drawbacks of the known processes but present on the contrary a great number of advantages.

The present invention consists in a process for de-arsenizing, de-antimonizing and/or de-bismuthizing aqueous acid solutions, more especially solutions from the electrorefining or electrowinning of copper, by liquid-liquid extraction, characterized in that the extraction is carried out :

a. by means of an organic liquid containing an organophosphoric compound having the general formula $(RO)_3P = O$ in which R represents an unsubstituted or substituted alkyl, aryl or aralkyl group;

b. at a temperature comprised between 10° and 60° C, c. and with a ratio "organic phase/aqueous phase" comprised between 0.1 and 5.

It has been found that the said organic liquid permits of extracting As, Sb and Bi in a particularly economical way, that is with a very high extraction rate and with very low losses of extractant, when operating under the above mentioned conditions.

The extraction according to the process of the present invention, may be carried out in any type of extractor. However, it has been found particularly advantageous to carry out the extraction in an apparatus of the mixer-settler type, in which use is made of flat bed turbines at such a speed that the product of factors $N^3 \times D^2$ shall be comprised between $2 \times 10^3$ and $4 \times 10^9$, N being the number of revolutions per minute of the turbine and D being the diameter of the turbine in centimeters. Indeed, that practice allows of obtaining both a very high extraction rate and a surprizingly easy separation of phases.

Use may advantageously be made of the tributylphosphate as the organophosphoric compound.

The said organic liquid may consist of the said organophosphoric compound in a non-diluted state or of a solution of the said organophosphoric compound in an inert organic solvent. Suitable inert solvents include aliphatic and aromatic hydrocarbons such as benzene, xylene, toluene, fuel oil and kerosene.

Moreover, it may contain an emulsion inhibitor, such as for example isodecanol.

The organic liquid may, after the extraction, be regenerated by treating it either with water, or with a base in solid form or with a base in a dissolved state, or with a reducer, for example $SO_2$. In the latter case, As, Sb and/or Bi are eliminated in the form of trivalent oxides.

Since the organic liquid extracts not only As, Sb, and/or Bi, but also a certain amount of acid, the said regeneration may advantageously be carried out in the following way. The organic liquid is first washed with an amount of water such that the major part of the acid and a minor amount of As, Sb and/or Bi are re-extracted; the organic liquid is afterwards washed with a second amount of water such that the As, Sb and/or Bi and the remainder of the acid contained therein shall be re-extracted. It may be useful to treat the organic liquid after the second washing with a basic solution such as for example a NaOH solution, in order to separate from said organic liquid the organic decomposition products which it contains.

The process according to the present invention is particularly efficient when the arsenic is in the pentavalent state, the antimony in trivalent or pentavalent state, and the bismuth in the trivalent state.

When applied to the purification of solutions from the bleeding of copper electrorefining, the process which is the object of the present invention presents numeros advantages with respect to the known purification processes of such solutions, such as:

selectivity of the extraction of arsenic, antimony and bismuth, which permits avoiding copper returns and the separation for example of the nickel in the form of sulphate, an excellent yield of extraction, no formation of dangerous and highly toxic compounds, possibility of suppressing the sodic refining at the anode furnace, improvement of the quality of the copper deposited by electroextraction in the absence of contamination by arsenic, antimony and bismuth, possibility of making the process wholly automatic and continuous.

An example of carrying out the process of invention is now given:

EXAMPLE

A solution from the bleeding of copper electrorefining, which has already been subjected to a first decopperizing and a preliminary concentration, is purified with undiluted tributylphosphate in a mixer-settler.

The solution from the bleeding contains in g/liter: 16.6 Cu, 34.7 Ni, 28 As, 0.47 Sb, and 600 $H_2SO_4$.

The extraction is carried out at 30° C in six stages, with a ratio "organic phase/aqueous phase"(O/A) = 0.7.

The mixing compartments which have a substantially square horizontal section measuring 3 100 $cm^2$, are provided with a flat blade turbine, having a diameter of 28 cm and rotating at a speed of 130 rpm.

The obtained raffinate contains in g/liter : 16.6 Cu, 34.7 Ni; 2 As, 0.1 Sb and 480 $H_2SO_4$.

The charged organic phase is first washed with water in two stages with a ratio O/A = 10. Use is made for the washing of a mixer-settler, in which the mixing compartments and the mixing conditions are identical to those described above for the extraction. The washwaters, which contain 600 g/liter of $H_2SO_4$ and 25 g/liter of As are recycled to the extraction department, where they are added to the bleeding solution to be purified.

The organic phase is afterwards eluated with water in five stages with a ratio O/A = 2. Use is made for this elution of a mixer-settler, the mixing compartments of which have a substantially square horizontal section of 8 100 $cm^2$ and are provided with a flat blade turbine with a diameter of 45 cm rotating at a speed of 110 rpm. The eluate obtained contains in g/liter : 50 As, 0.71 Sb and 38 $H_2SO_4$.

The organic phase is then either immediately recycled to the extraction department, or discoloured before recycling by treatment with a 150 g/liter of a solution of NaOH in one stage with a ration O/A = 10.

What we claim is:

1. A process for treating a solution from the bleeding of copper electrorefining or copper electrowinning, said solution being an aqueous sulfuric acid solution containing arsenic and copper, said process comprising contacting the solution with an organic phase comprising an organophosphoric compound having the general formula $(RO)_3P=O$ wherein R represents an unsubstituted or substituted alkyl, aryl or aralkyl group, while maintaining a temperature of between 10° and 60° and an organic phase/aqueous phase ratio of between 0.1 and 5, whereby arsenic and acid are extracted from the aqueous phase to the organic phase and copper remains in the aqueous phase, and separating the resultant pregnant organic phase from the aqueous phase.

2. A process according to claim 1 wherein the bleeding solution has been subjected to a partial decopperizing and a preliminary concentration.

3. A process according to claim 1 wherein arsenic is in the pentavalent state.

4. A process according to claim 1 wherein the said contacting is carried out in an apparatus of the mixer-settler type, in which flat blade turbines are operated at a speed such that the product $N^3 \times D^2$ shall be comprised between $2 \times 10^3$ and $4 \times 10^9$, N being the number of rotations per minute and D the diameter of the turbine in centimeters.

5. A process according to claim 1 wherein the said organophosphoric compound is tributylphosphate.

6. A process according to claim 1 wherein the said organic phase is an undiluted organophosphoric compound.

7. A process according to claim 1 wherein the said organic phase contains an inert organic solvent.

8. A process according to claim 1 wherein the said organic phase contains an emulsion inhibitor.

9. A process according to claim 8 wherein the said organic phase contains isodecanol as the emulsion inhibitor.

10. A process according to claim 1 wherein the said pregnant organic phase is contacted with a substance selected from the group of substances consisting of water, an aqueous basic solution and a solid base, whereby acid and arsenic is re-extracted from the organic phase.

11. A process according to claim 1 wherein the said pregnant organic phase is contacted with a reducing agent, whereby arsenic is re-extracted from the organic phase.

12. A process according to claim 1 wherein the said pregnant organic phase is stripped from the major part of its acid content by a first water-washing and is afterwards stripped from the rest of its charge by a second water-washing.

13. A process according to claim 1 wherein the said pregnant organic phase is stripped from its charge by water-washing and is afterwards contacted with a basic solution.

14. A process for treating an aqueous sulfuric acid solution containing arsenic and copper, said process comprising contacting the aqueous solution with an organic phase comprising an organophosphoric compound having the general formula $(RO)_3P=O$ wherein R represents an unsubstituted or substituted alkyl, aryl or aralkyl group, while maintaining a temperature of between 10° and 60° C and an organic phase/aqueous phase ratio of between 0.1 and 5, whereby arsenic and acid are extracted from the aqueous phase to the organic phase and copper remains in the aqueous phase, and separating the resultant pregnant organic phase from the aqueous phase.

* * * * *